Aug. 15, 1961 M. F. PAUL 2,996,312
FIFTH WHEEL WEIGHT DISTRIBUTOR
Filed Aug. 10, 1959 2 Sheets-Sheet 1
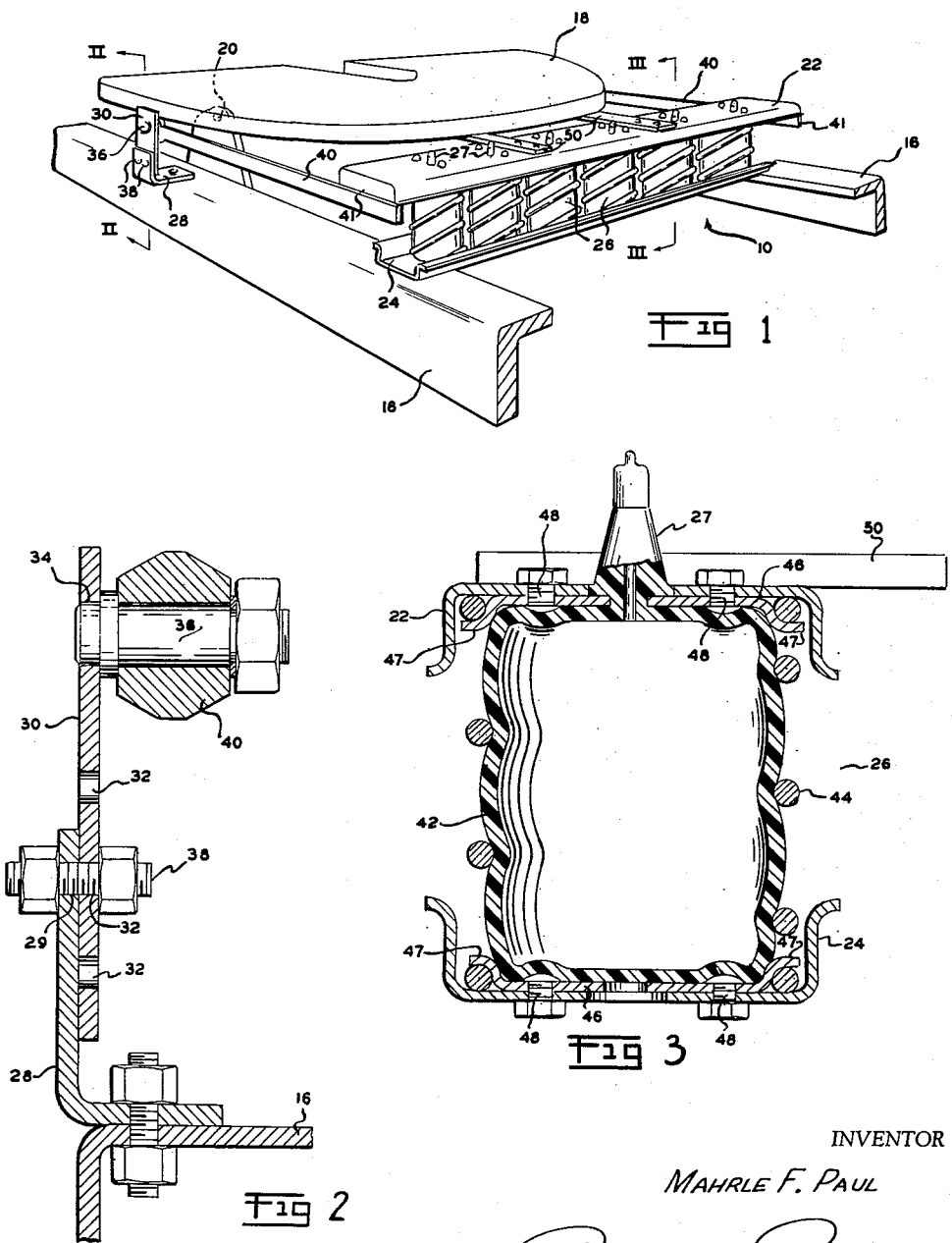
INVENTOR
MAHRLE F. PAUL
BY
ATTORNEY

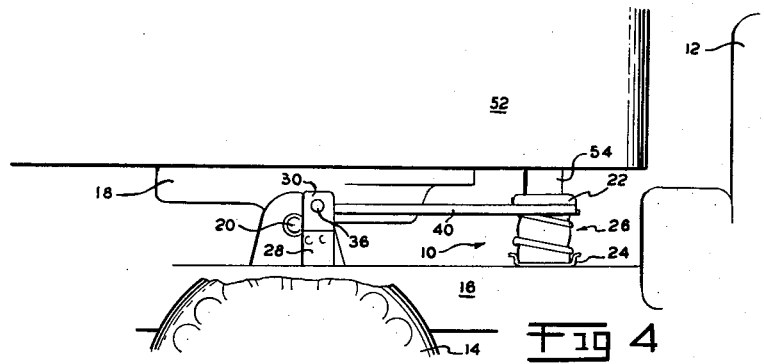
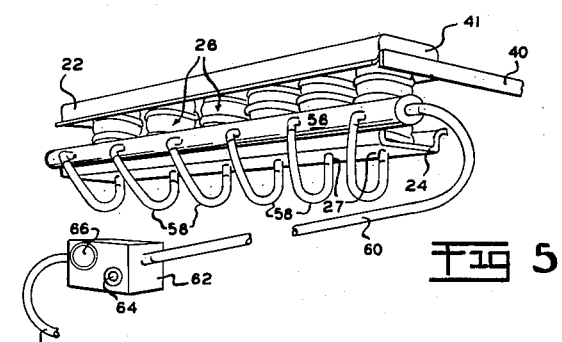
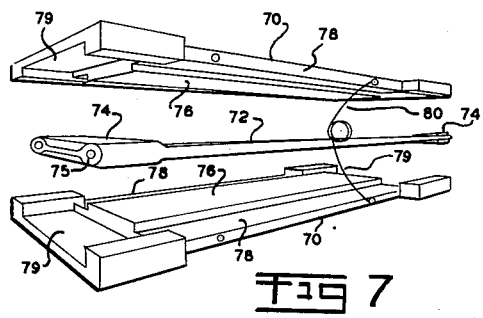
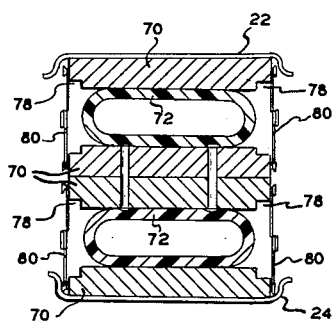

United States Patent Office 2,996,312
Patented Aug. 15, 1961

2,996,312
FIFTH WHEEL WEIGHT DISTRIBUTOR
Mahrle F. Paul, 4329 Page Ave., Michigan Center, Mich.
Filed Aug. 10, 1959, Ser. No. 832,688
10 Claims. (Cl. 280—406)

The invention relates to weight distributors for use with fifth wheel vehicle structure and particularly pertains to a weight distributor which also functions to substantially improve the riding qualities of tractors partially supporting the weight of trailer loads.

The conventionally mounted fifth wheel as used with tractors drawing semi-trailers is usually placed directly above or slightly ahead of the rear axle of the tractor whereby the trailer load supported by the tractor is primarily imposed upon the rear axle. This construction is partially necessitated by the front overhang of the trailer and other dimensional restrictions which dictate the tractor and trailer sizes to comply with State and Federal restrictions as well as for reasons pertaining to ease of maneuverability. Thus, practically all of the trailer weight carried by the tractor is imposed upon the rear axle thereof and the front trailer axle supports little more than a proportion of the tractor weight. As maximum permissible loads are determined by axle weights heavier trailer loads could be carried if more of the load weight could be borne by the tractor front axle. The present invention contemplates a device which may be attached to a tractor to distribute a controlled percentage of the trailer load to the front axle and hence increase the lawful maximum weight permitted to be carried by a tractor-trailer unit of a given number of axles.

Another disadvantage with conventional fifth wheel construction lies in the rough riding characteristics produced, especially when hauling empty trailers. The fifth wheel is pivoted for rotation about an axis perpendicular to the axis of the trailer and as the rear end of the trailer rises and falls during travelling the shocks transmitted to the tractor through the fifth wheel are very tiring to the driver and often result in internal injuries over a period of time. It is a purpose of the invention to provide a device which will cushion and absorb vibrations of the trailer before being transmitted to the tractor so as to materially improve the riding qualities of the tractor under all load conditions of the trailer.

It is thus an object of the invention to provide a weight distributor for vehicles employing fifth wheels wherein a controlled percentage of the trailer weight borne by the vehicle can be imposed on the vehicle front axle and the trailer weight regulated, within limits, between the front and rear axles of the vehicle.

A further object of the invention is to provide a weight distributor for vehicles employing fifth wheels wherein the distributor is in the form of an attachment and may easily be mounted upon existing vehicles.

Another object of the invention is to provide a weight distributor for use with fifth wheels which functions to cushion, absorb and minimize shocks and vibrations transmitted from the trailer to the fifth wheel and which substantially increases the riding comfort within the tractor.

Yet a further object of the invention is to provide a weight distributor for fifth wheels which also functions as a cushioning member and wherein the degree of weight distribution and cushioning may be easily regulated, and in one embodiment of the invention may be regulated while the tractor is in motion.

Another object of the invention is to provide a weight distributor and cushioning device of the described type which is largely manufactured from available materials and may be produced economically by conventional fabricating methods.

These and other objects of the invention will become apparent from the following description and accompanying drawings, wherein:

FIG. 1 is a perspective view of one embodiment of the invention as mounted on a tractor and associated with a fifth wheel, FIG. 2 is a sectional, elevational view of one of the mounting brackets as taken along line II—II of FIG. 1, FIG. 3 is a sectional elevational view taken through one of the air spring members along line III—III of FIG. 1, FIG. 4 is an elevational view of a modification of use of the embodiment of FIG. 1 wherein the weight distributor reacts against the trailer directly, FIG. 5 is a perspective view of another embodiment of the invention wherein the air pressure within the air spring members may be regulated by remote control means located within the cab of the tractor, FIG. 6 is a sectional elevational view of another modification of the invention taken through the upper and lower beams intermediate the ends thereof wherein another type of air cushioning member is illustrated, and FIG. 7 is a perspective exploded view of the air spring elements employed with the embodiment of FIG. 6.

As best shown in FIG. 4 the weight distributor, generally indicated at 10, is mounted upon a tractor having a cab 12, rear wheels 14 and axle, primary frame members 16 and a fifth wheel 18 which is mounted upon the frame above the rear axle. The fifth wheel is pivoted upon an axis 20 which is usually located directly above the rear axle.

Referring now to FIGS. 1 and 3 the weight distributor 10 basically consists of an upper beam 22 which either directly or indirectly engages the underside of the front edge of the fifth wheel 18, a lower beam 24 which is affixed across the frame members 16 directly below the upper beam 22 and resilient pressure means interposed between the lower and upper beams which preferably take the form of air springs 26. Thus, the interposing of the distributor 10 between the front edge of the fifth wheel and the tractor frame will control the pivoting of the fifth wheel 18 about the axis 20 and the upward force produced by the distributor on the front edge of the fifth wheel tends to lift the trailer and thus a portion of the weight usually transmitted to the fifth wheel axis 20 may be transmitted through the distributor 10 to the tractor frame at a point intermediate the front and rear axles whereby the load carried by the front axle may be increased and regulated by controlling the pressure conditions within air springs 26.

The beams 22 and 24 are preferably formed of modified channel stock, FIG. 3, wherein high strength is achieved with a relatively thin wall thickness. If desired, conventional channel stock or other structural members may be used. While the lower beam 24 is directly affixed to the tractor frame members 16 the upper beam 22 is mounted for movement relative to the tractor frame. To this end an L-shaped bracket 28 is bolted to each of the members 16 near the axis 20, FIG. 1, the horizontal base of bracket 28 being provided with a hole to receive a suitable bolt and the vertical leg of the bracket is formed with a pair of horizontally disposed holes 29. The second part of bracket 28 consists of an element 30 having several pairs of holes 32 formed therein in vertically spaced relation adjacent the lower end of element 30 and a hole 34 formed in the upper end to receive a pivot pin 36. Bolts 38 extending through the holes 29 and cooperating with the desired pair of holes 32 to permit the element 30 to be vertically adjusted and thereby vary the height of pivot pins 36 above the tractor frame. This adjustable feature is desired to permit the weight distributor 10 to be attached to a wide variety of tractors without requiring modification of the distributor.

A pivot arm 40 is associated with each of the pins 36 and is affixed to an end plate 41 which is attached to each end of the upper beam 22. The arms 40 are enlarged and bored at the pivot end to receive the pin 36. It will thus be appreciated that the upper beam 22 may pivot in an arc similar to that of the front edge of the fifth wheel and that the pivot arms and brackets will prevent the upper beam from horizontally shifting relative to the lower beam 24.

The air spring 26 may take several forms. The illustrated form of FIGS. 1–5 is of the type used to augment the conventional springs of vehicles as set forth in U.S. Patent No. 2,710,184 and have been found to be very satisfactory when used as a component of the invention. The air springs 26 consist of a cylindrical bag 42 of rubber, neoprene or the like having a valve stem 27 affixed thereto for purposes of inflation. A helical spring 44 of large pitch encompasses each bag to limit the transverse expansion thereof and retain the walls. Clamps 46 are used to maintain the air spring bags in place and consist of substantially planar members having circular depressions 47 which receive the spring 44 and hold the ends of the spring against the respective beam. A pair of bolts 48 extend through each clamp and the associated beam to firmly hold the clamp and spring against the beam and hence fix the bags 42 in position between the upper and lower beams. The valve stems 27 may extend through holes provided in the top beam.

As the dimensions and relationships of fifth wheels and tractor frames vary with different makes of tractors a pair of blocks 50 may be attached to the upper beam 22 and extend under the front edge of the fifth wheel 18 to insure that the fifth wheel will engage the weight distributor 10 even though the radius of the fifth wheel may be so small that the front edge will not extend out over the upper beam 22. Blocks 50 may be furnished in different heights or may be built up to compensate for different dimensional occurrences and in many cases the blocks 50 will not be required at all if the fifth wheel properly engages the upper beam directly.

In operation the weight distributor 10 is assembled upon the tractor as shown in FIG. 1 and the air springs 26 are charged with the desired pressure. The pressure employed within the air springs will depend on the weight of the trailer load, the percentage of the load that is to be carried by the front and rear axles of the tractor and the degree of cushioning desired; e.g., when hauling an empty trailer optimum riding characteristics will be obtained with a different air pressure than is required for pulling a loaded trailer. As the air springs 26 will force the upper beam 22 toward the fifth wheel and attempt to pivot the fifth wheel against the weight of the trailer resting thereon a portion of the trailer weight will be transmitted through the distributor 10. As the lower beam 24 is located intermediate the rear and front axles a bridging effect takes place due to the fifth wheel reacting against the trailer and tending to lift the trailer which tends to increase the weight on the front axle of the tractor and the trailer axle and decrease the weight supported by the tractor rear axle.

As the trailer rides over bumps in the road the cushioning effect produced by the air springs 26 to absorb the shock and impacts transmitted to the fifth wheel materially improves the riding qualities of the tractor and as the air pressure within springs 26 can be regulated by adding or bleeding off air the driver may regulate the operating characteristics to his tastes. It will be understood that the valve stems of the air springs 26 are similar to those employed with inflated tires and conventional air hoses and gauges may be used to regulate the pressure with the bags 42.

A modification of the manner in which the weight distributor may be employed is illustrated in FIG. 4. In those instances where it is desired to shift the weight of the trailer further forward on the tractor than is possible with the arrangement of FIG. 1 or wherein the weight distributor is employed to transmit a large percentage of the trailer load to the tractor it is desirable that the weight distributor 10 react against the trailer 52 directly rather than through the fifth wheel. There is often considerable trailer overhang forward of the king pin and by mounting the weight distributor forward of the fifth wheel and employing blocks 54 affixed to the upper beam 22 to engage the underside of the trailer directly the principles of the invention may be practiced as the trailer overhang functions in effect, as an extension of the fifth wheel. To employ this arrangement it would be desirable to affix a smooth surfaced plate to the underside of the trailer at the location engaged by the blocks 54, if the trailer is not already provided with a smooth surface, as the trailer will move relative to the blocks during turning and a greased smooth surface plate will provide an adequate bearing surface.

To utilize the principles of the invention to the best advantage it is desirable that the pressure within air springs 26 be regulated in accordance with the trailer load, desired weight distribution on the axles of the tractor, position of the load within the trailer, road condition and other factors which are apt to vary within short periods of time. As the air springs of the embodiment of FIG. 1 are individually charged with air, the driver will sometimes neglect to reduce or add air pressure upon changing the load characteristics of the trailer and hence the embodiment of FIG. 5 is provided with means for regulating the air pressure within the springs 26 from the cab of the tractor whereby the load carried by the weight distributor 10 can be very easily changed while the tractor is in motion and accurate regulation of the characteristics of the weight distributor can be produced as desired.

To this end a manifold conduit 56 is attached to the lower beam 24 and a plurality of feed conduits 58 are attached to the manifold in communication therewith and also communicate with the individual valve stems of the air springs 26. A conduit 60, usually a rubber hose, also communicates with manifold 56 and leads into the interior of the tractor cab. A control valve box 62 containing a pressure regulating valve adjusted by a knob 64 and a gauge 66 located on the output side of the regulating valve is mounted within the cab and the conduit 60 is attached to the gauge whereby the pressure within the air springs 26 will be recorded on the gauge 66. It will be appreciated that the poppet valves within the air spring valve stems are removed in this embodiment of the invention. An air supply conduit 68 which is connected to the inlet of the regulating valve carries compressed air from the tractor air system to the valve box 62 and provides the air for the springs 26. The regulating valve within box 62 is of conventional design and it is believed that the system will be understood from the above description.

The basic components of the embodiment of FIG. 5 are the same as that of FIG. 1 except that the valve stems 27 of the bags 42 are shown extending through the lower beam instead of the upper beam. This change is merely a matter of choice and is determined by the clearance of the particular tractor and fifth wheel on which the weight distributor is mounted. It will be understood that where the bag valve stems project through the upper beam 22 the manifold conduit 56 would be best affixed to the upper beam.

In operation the embodiment of FIG. 5 will function as that of FIG. 1; however, by regulating the pressure within the air springs 26 from the cab the driver will immediately change the weight distribution and cushioning characteristics to suit the particular load, road conditions, etc.

A further embodiment of the invention is illustrated in FIGS. 6 and 7 wherein another type of air spring or expander is employed. The basic structure of this embodiment of the weight distributor is similar to that of FIG. 1 except for the air spring units which are shown in FIG. 7 and consist of a pair of rigid shoes 70 which "sandwich" a flexible expandable tube 72 therebetween. The tube 72 is a section of rubber hose or similar material which is flexible and which will expand from a flattened deflated shape to a cylindrical inflated shape in the manner of canvas fire hose when pressurized water is pumped therethrough. The tube 72 may be formed from a section of hose-like material which is closed at each end by a fitting 74, one of which has an opening 75 to receive a conduit fitting whereby pressurized air may be introduced into the interior of the tube. The shoes 70 are made of steel and have a planar surface 76 which engages the tube 72 at all conditions of inflation and the surface 76 is longitudinally recessed at 78 to prevent sharp bending of the longitudinal edges of the tube during complete deflation thereof. The shoes 70 are also recessed at each end as at 79 to provide clearance for the fittings 74 when the tube is deflated. Springs 80, two of which are used on each side, maintain the tube and shoes in the assembled relation whereby during deflation of the tube 72 the shoes will be separated the minimum distance and upon inflation of the tube the tendency of the tube to assume a cylindrical cross section will separate the shoes 70 moving them apart in parallel relation. The above described air expander or spring is commercially available and is known as the Merriman "Windjammer" and is produced by the H. H. Merriman Co. of Jackson, Michigan, and is described in U.S. application No. 771,113, filed October 31, 1958.

As will be apparent from FIG. 6 several of the tube and shoe units may be stacked together, the contiguous shoes being bolted or riveted together, between the upper and lower beams 22 and 24 respectively and the shoes adjacent the beams are bolted thereto. The shoes and tubes are of a length approximately equal to the beams and the air pressure within the tubes may either be regulated by individual valve stems mounted in one of the fittings 74 of each tube as in a manner similar to the bags 42 of FIG. 1 or conduits may connect the tubes to the tractor air source and regulator valve as in the embodiment of FIG. 5. This construction of air spring is capable of providing high forces over considerable lengths and considerable expansion between the upper and lower beams is possible when several of these units are stacked together.

It will thus be appreciated that the invention provides a weight distributor for vehicles employing fifth wheels which may be manufactured and sold as an attachment for existing tractors and which require very little in the way of tractor modification for installation. The fact that the air spring pressures may be regulated as desired permits the distributor to assume as much or as little of the trailer load as best fit the particular conditions, although the basic principle of the invention could be practiced by using compression springs in place of the air springs. Improved weight distribution upon trailer tractors results in a higher payload and improved riding qualities, and from extensive road tests it has been proven that the distributor of the invention will substantially increase the life of the tractor drive tires.

As other modifications than those illustrated may be apparent to those skilled in the art within the spirit of the invention it is intended that the invention be defined only by the scope of the following claims.

I claim:

1. A weight distributor for use with vehicle frame mounted pivoted fifth wheels having a front edge comprising expandable pressure means adapted to be operatively interposed between the underside of the fifth wheel front edge and the vehicle frame at a point horizontally displaced from the fifth wheel pivoting axis and beneath the fifth wheel front edge whereby loads imposed on the fifth wheel may be partially transmitted through said expandable means in a direction substantially perpendicular to the general plane of the vehicle frame to distribute the load upon the frame.

2. In a weight distributor as in claim 1 wherein remote regulating means cooperate with said expandable pressure means whereby the force exerted by said expandable means may be varied from a location remote from the weight distributor position.

3. A weight distributor for use with vehicle frame mounted pivoted fifth wheels comprising a first member pivotally mounted to the vehicle frame for vertical movement thereto and adapted to operatively associate with the front edge of the fifth wheel, a second member affixed to the vehicle frame below said first member and expandable pressure means interposed between said first and second members whereby a portion of the load imposed on the fifth wheel may be transferred to the vehicle frame through said expandable means.

4. In a weight distributor as in claim 3 wherein said expandable pressure means comprises inflatable pneumatic expansion devices affixed to the members.

5. In a weight distributor as in claim 4 wherein said pneumatic expansion devices comprise flexible walled bags encompassed within helical springs having valve stem means permitting regulation of pressure within the bags.

6. In a weight distributor as in claim 4 wherein said pneumatic expansion devices comprise inflatable flexible tubes interposed between rigid elongated shoe elements.

7. A weight distributor for use with vehicle frame mounted pivoted fifth wheels comprising a first elongated rigid beam member extending transversely with respect to said vehicle frame, means pivotally mounting said first beam member upon the vehicle frame for vertical movement thereto, said first beam adapted to operatively associate with the underside of the front edge of the fifth wheel, a second beam member fixed to the vehicle frame below said first beam and transversely disposed to the vehicle frame and parallel to said first beam and pneumatic expandable pressure means interposed between said first and second beams.

8. In a weight distributor as in claim 7 wherein said pneumatic expandable means comprises a plurality of inflatable flexible units, means communicating said units with a common source of compressed air and regulating means interposed between said units and said source of compressed air adapted to control the pressure within said units.

9. In a weight distributor as in claim 7 wherein said means pivotally mounted said first beam member includes a pair of brackets affixed to the vehicle frame on opposite sides of the fifth wheel, a pivot mounting element vertically positionable upon each of said brackets and arms pivotally attached to said elements and fixed to said first beam member.

10. A weight distributor attachment for use with vehicles supporting trailer loads comprising an elongated upper beam adapted to receive a portion of the trailer load, an elongated lower beam parallel to and spaced below said upper beam adapted to be mounted upon the vehicle structure, pneumatic expandable pressure means interposed between said upper and lower beams, a pair of arms affixed at one end to said upper beam and pivotally attached to bracket elements at the other end, said bracket elements being affixed to the vehicle frame.

(References on following page)

References Cited in the file of this patent

UNITED STATES PATENTS

| | | |
|---|---|---|
| 2,391,372 | Weigand | Dec. 18, 1945 |
| 2,710,184 | Pemberton | June 7, 1955 |
| 2,727,755 | Hume | Dec. 20, 1955 |
| 2,733,931 | Reid | Feb. 7, 1956 |
| 2,847,230 | Hendrickson et al. | Aug. 12, 1958 |

FOREIGN PATENTS

| | | |
|---|---|---|
| T1,2128 | Germany | Sept. 20, 1956 |
| 1,062,552 | Germany | Jan. 22, 1958 |